(12) United States Patent
Franchi et al.

(10) Patent No.: US 12,738,167 B2
(45) Date of Patent: Sep. 15, 2026

(54) METHOD FOR MONITORING A VEHICLE CONVOY BY MEANS OF VEHICLE-TO-VEHICLE COMMUNICATION

(71) Applicants: Technische Universität Dresden, Dresden (DE); Vodafone GmbH, Dusseldorf (DE)

(72) Inventors: Norman Franchi, Dresden (DE); Arturo Antonio Gonzalez Rodriguez, Dresden (DE); Jurgen Caldenhoven, Dusseldorf (DE)

(73) Assignees: TECHNISCHE UNIVERSITÄT DRESDEN (DE); VODAFONE GMBH (DE)

( * ) Notice: Subject to any disclaimer, the term of this patent is extended or adjusted under 35 U.S.C. 154(b) by 495 days.

(21) Appl. No.: 17/603,477

(22) PCT Filed: Apr. 8, 2020

(86) PCT No.: PCT/EP2020/060051
§ 371 (c)(1),
(2) Date: Oct. 13, 2021

(87) PCT Pub. No.: WO2020/212231
PCT Pub. Date: Oct. 22, 2020

(65) Prior Publication Data

US 2022/0262257 A1 Aug. 18, 2022

(30) Foreign Application Priority Data

Apr. 15, 2019 (DE) ......................... 102019205435.8
Jul. 17, 2019 (DE) ......................... 102019210559.9

(51) Int. Cl.
*G08G 1/00* (2006.01)
*B60W 30/14* (2006.01)
(Continued)

(52) U.S. Cl.
CPC ............ *G08G 1/22* (2013.01); *B60W 30/143* (2013.01); *B60W 30/165* (2013.01);
(Continued)

(58) Field of Classification Search
CPC .... G08G 1/22; B60W 30/143; B60W 30/165; B60W 2556/65; G05D 1/0293; H04W 4/46
See application file for complete search history.

(56) References Cited

U.S. PATENT DOCUMENTS 8,922,390 B2 12/2014 Stählin et al.
9,141,112 B1 * 9/2015 Loo ................. G08G 1/096838
(Continued)

FOREIGN PATENT DOCUMENTS

DE 10 2010 038 640 A1 2/2012
DE 10 2016 209 514 A1 12/2017
(Continued)

OTHER PUBLICATIONS

From the European Patent Office as the ISA, International Search Report corresponding to PCT/EP2020/060051, Jun. 8, 2020, 4 pages.

(Continued)

*Primary Examiner* — Navid Z. Mehdizadeh
*Assistant Examiner* — Caitlin R McCleary
(74) *Attorney, Agent, or Firm* — Schmidt Patent Law, Inc.

(57) ABSTRACT

The present invention relates to a method for monitoring a vehicle convoy containing at least two vehicles (1.1, 1.2), wherein the at least two vehicles (1.1, 1.2) in the vehicle convoy are each formed with a communication system, which is configured to use vehicle-to-vehicle communication to send and/or receive information, and a measuring apparatus, which is configured to capture values for at least one kinematic state parameter. The method involves kine- (Continued)

Figure 1:
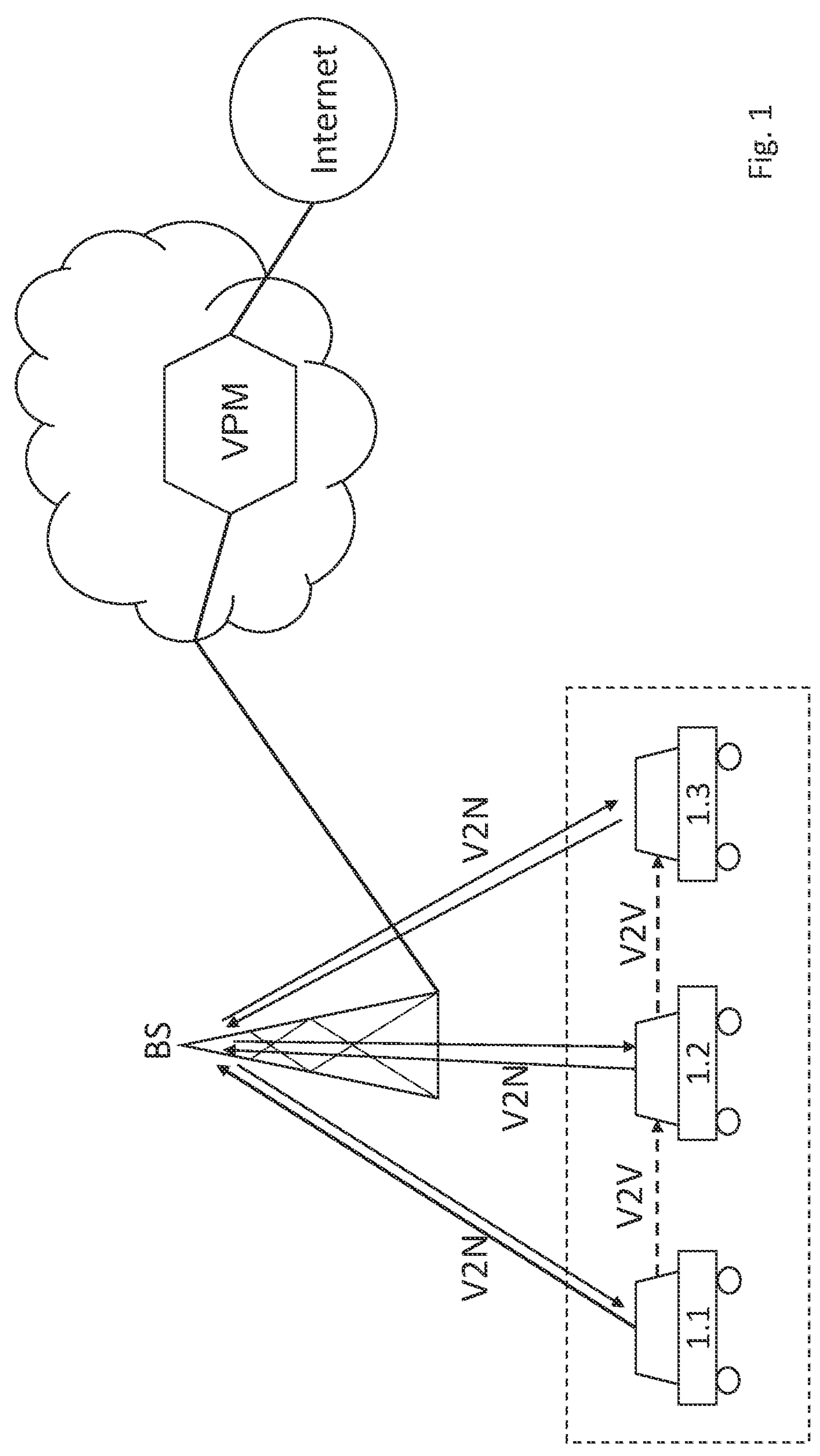

matic state parameters being ascertained and regulated for at least one pair of vehicles (1.1, 1.2) in the vehicle convoy, which pair is formed by a first vehicle (1.1) in the vehicle convoy and a second vehicle (1.2) in the vehicle convoy arranged directly after the first vehicle (1.1) in the vehicle convoy, by means of allocated time and frequency resources.

20 Claims, 10 Drawing Sheets

(51) Int. Cl.
*B60W 30/165* (2020.01)
*G05D 1/00* (2024.01)
*H04W 4/46* (2018.01)

(52) U.S. Cl.
CPC ............ *G05D 1/0293* (2013.01); *H04W 4/46* (2018.02); *B60W 2556/65* (2020.02)

(56) References Cited

U.S. PATENT DOCUMENTS

2013/0131949 A1* 5/2013 Shida .................... B60K 31/00 701/96
2015/0327028 A1* 11/2015 Zhang .................... H04L 67/12 455/452.1
2016/0254889 A1* 9/2016 Shattil .................. H04L 5/0035 370/329
2017/0181030 A1* 6/2017 Han ....................... H04L 47/10
2017/0232943 A1* 8/2017 Brooks ................... G08G 1/22 701/19
2018/0084511 A1* 3/2018 Wu ........................ H04W 72/20
2018/0213376 A1* 7/2018 Pinheiro ............... H04W 72/30
2019/0232962 A1 8/2019 Broll et al.
2019/0385461 A1* 12/2019 Blomstrand ............ B60D 1/44
2021/0297210 A1* 9/2021 Seo ....................... H04W 72/20
2022/0005353 A1* 1/2022 Hwang .................. H04W 4/40
2022/0182206 A1* 6/2022 Zhao ..................... H04L 5/0055

FOREIGN PATENT DOCUMENTS

DE 102016011325 A1 3/2018
DE 10 2017 002 381 A1 9/2018

OTHER PUBLICATIONS

Dolk, "Event-Triggered Control for String-Stable Vehicle Platooning", IEEE Transactions on Intelligent Transportation systems, vol. 18, No. 12, Dec. 2017, 15 pages.

* cited by examiner

METHOD FOR MONITORING A VEHICLE CONVOY BY MEANS OF VEHICLE-TO-VEHICLE COMMUNICATION

This application is a 371 national phase entry of International Patent Application No. PCT/EP2020/060051 filed Apr. 8, 2020, which claims benefit of priority to German Patent Application No. 102019205435.8 filed Apr. 15, 2019 and to German Patent Application No. 102019210559.9 filed Jul. 17, 2019. Each of these priority applications is incorporated herein by reference in its entirety.

The invention relates to a method for monitoring a vehicle platoon containing at least two vehicles by means of vehicle-to-vehicle communication. Besides direct communication between two vehicles, vehicle-to-vehicle communication is understood as communication via a communication network in which the vehicles communicate with each other via the network. The network may also be a mobile communication network, in particular. Driving a plurality of vehicles that immediately succeed each other within a vehicle platoon (also referred to as "platooning") can result in significant fuel savings for the vehicles following directly behind the lead vehicle of the vehicle platoon, and can also increase traffic efficiency. The reduction in fuel consumption is all the greater, the smaller the inter-vehicle distance that can be selected or that can be maintained over a longer period of time. Traffic efficiency is improved in that shorter distances between vehicles allows a higher vehicle throughput on roads.

By means of a control loop for controlling each vehicle in the platoon, it is possible to achieve at least partially automated control of the desired headway distances and speeds as kinematic targets. Adaptive cruise control systems (ACC) are known from the prior art, in which a control loop of a vehicle takes into account sensor data of a radar and/or lidar system which is located on the vehicle and which can sense the headway distance to a vehicle ahead and/or the speed of the vehicle. However, if the headway distances between the vehicles in a vehicle platoon that is controlled by an ACC system are too small, minor disruptions or deviations from the kinematic targets, caused by an unforeseen braking operation, for example, can propagate and intensify along the vehicle platoon. Such instability then jeopardizes the safety, efficiency and controllability of the vehicle platoon.

The string stability at small headway distances and high speeds can be improved by a cooperative adaptive cruise control system (CACC) in which, in addition to the sensor data of a vehicle, a control loop also takes into account kinematic control parameters of the vehicle directly ahead, as input variables, for example values for the instantaneous or intended acceleration of the vehicle directly ahead. With this additional information, smaller headway distances between the vehicles can be achieved at higher speeds, thus resulting as well in greater fuel savings and/or a greater traffic throughput.

However, the headway distances and speeds that can actually be achieved by means of a CACC system, while ensuring string stability, depend heavily on the quality and granularity of the transmission resources that are available for vehicle-to-vehicle communication and with which the kinematic control parameters can be exchanged and updated between the vehicles. In mobile communication networks, however, the period duration of a data transmission session is always longer than a specified minimum duration. In the LTE (Long Term Evolution) standard, for example, the shortest possible duration of a semi-persistent data transmission session is 20 ms. The minimum duration then corresponds to a minimum delay time at which kinematic control parameters can be updated by means of a semipersistent vehicle-to-vehicle data transmission session. This also limits the smallest possible predefinable headway distance between two immediately successive vehicles in the vehicle platoon. In the absence of a suitable model, the period duration is also selected ad hoc in many cases to be longer than the destination specifications and the vehicle specific control parameters would allow. However, a duration or delay time that is too long can result in a CACC system effectively being degraded to an ACC system, with the consequence that conditions for string stability can be longer be complied with.

The object of the present invention is therefore to propose an efficient method with which particularly short headway distances between the vehicles in a vehicle platoon at simultaneously high speeds, while still ensuring string stability.

According to the invention, the object is achieved by the features specified in claim 1. Advantageous variants result from the features mentioned in the dependent claims.

The invention relates to a method for monitoring a vehicle platoon containing at least two vehicles, wherein the at least two vehicles in the vehicle platoon are each provided with a communication system which is configured to transmit and/or receive information by means of vehicle-to-vehicle communication and with a measuring apparatus which is configured to capture kinematic state parameters, and a second vehicle of at least one pair of vehicles in the vehicle platoon, the at least one pair of vehicles being formed by the second vehicle in the vehicle platoon and by a first vehicle in the vehicle platoon arranged directly ahead of the second vehicle, is designed to regulate control of the second vehicle, taking into account the values for at least one kinematic control parameter received from the first vehicle, with the aim of adjusting, to kinematic targets, the values for at least one kinematic state parameter measured by means of the at least one measuring apparatus of the second vehicle of the at least one pair of vehicles. In the method, the following steps are carried out:

(a) At least one maximum delay time for the vehicle-to-vehicle communication is defined in such a way that at least one condition for maintaining the string stability of the platoon is fulfilled when kinematic targets and vehicle-specific control parameters are taken into account.

(b) Transmission resources for the vehicle-to-vehicle communication between the first vehicle and the second vehicle are determined, wherein the transmission resources include at least one data transmission session, taking the at least one maximum delay time into account.

The transmission resources are determined in such a way that the values for at least one kinematic control parameter can be transmitted as information by the first vehicle of the at least one pair of vehicles by means of the determined transmission resources for vehicle-to-vehicle communication, with a time interval that is less than the specified at least one maximum delay time, and can be received by the second vehicle of the at least one pair of vehicles by means of the transmission resources for the vehicle-to-vehicle communication.

The method according to the invention allows transmission resources for the vehicle-to-vehicle communication to be used in a particularly efficient manner. The expression "vehicle-to-vehicle communication" should also be understood to include inter-vehicle communication by means of a network, i.e. "vehicle-to-network-to-vehicle communication". The method allows the delay times or time intervals at which information can be transmitted from vehicle to vehicle or updated in a control loop of a vehicle to be determined systematically. By ensuring string stability when determining the maximum delay times or time intervals of the information transmitted or received via the vehicle-to-vehicle communication, it is possible to achieve particularly small headway distances between the vehicles at high speeds. Maintaining string stability also enhances ride comfort and ensures stable control of the vehicle platoon over a longer period of time. An adaptive communication method for dynamic control of a vehicle platoon is thus realized.

The transmission resources may include time and/or frequency resources, in particular, but also energy resources, coding resources and/or modulation.

At least the first vehicle of the at least one pair of vehicles can receive information about the transmission resources determined for vehicle-to-vehicle communication. On the basis of this information, the values for the at least one kinematic control parameter can be sent by the first vehicle and received by the second vehicle.

In one embodiment of the invention, the kinematic targets can be specified by taking into account destination parameters and/or vehicle-specific control parameters that are provided at least partly by vehicles in the vehicle platoon.

This allows the vehicle-to-vehicle communication to be adapted particularly precisely to the trip itinerary and to the technical equipment or condition of the vehicles.

The steps in the method according to the invention are preferably carried out for all pairs of vehicles in the vehicle platoon that can be formed by a first vehicle in the vehicle platoon and by a second vehicle in the vehicle platoon immediately following the first vehicle in the vehicle platoon. In a vehicle platoon formed by N vehicles, exactly N−1 such vehicle pairs can be defined. Thus, the at least two vehicles typically form at least one pair of vehicles.

A vehicle platoon may include a lead vehicle arranged at the start of the vehicle platoon in the direction of travel, an organizer vehicle configured to exchange information between the organizer vehicle and all the other vehicles in the vehicle platoon via the vehicle-to-vehicle communication, and/or a network vehicle configured to exchange information between the network vehicle and a base station of a mobile communication network via the vehicle-to-network communication. A lead vehicle, an organizer vehicle, and/or a network vehicle can also be formed by the same vehicle or by the same vehicle in the vehicle platoon.

A vehicle platoon manager may be formed at least temporarily by a processing unit in the form of a computer running an appropriate computer program and/or by a human operator that operates the processing unit. The vehicle platoon manager can be disposed on a lead vehicle, an organizer vehicle, and/or a network vehicle. However, the vehicle platoon manager can also exchange information with one or more vehicles in the vehicle platoon via a base station of a mobile network and not be disposed on any of the vehicles in the vehicle platoon.

Vehicle platooning may include steps which already start before step (a) of the method according to the invention and/or which restart after an external event occurs. For example, the formation of a vehicle platoon may begin by vehicles transmitting to a vehicle platoon manager, by means of vehicle-to-vehicle or vehicle-to-network communication, a notice of intent to form a vehicle platoon with other vehicles. This platoon formation request may contain at least one position, at least one speed, at least one vehicle-specific destination and/or at least one vehicle-specific control parameter.

The vehicle platoon manager may group vehicles into a vehicle platoon by taking into account the platoon formation requests, and may specify kinematic targets, destination parameters or destination specifications, at least one vehicle platoon identification number and a vehicle identification number for each vehicle in the vehicle platoon. Destination parameters may include one or more destinations, one or more routes, the maximum speed permitted along the one or more routes, and/or traffic information.

Based on the indications of position and destination and the direction of travel, the vehicle platoon manager may specify or allocate the vehicle identification numbers in such a way that the vehicle which is the smallest distance away from a destination is allocated vehicle identification number 1, whereby the vehicle which is the smallest distance away from a destination can be the lead vehicle. Vehicles which are the second smallest, third smallest, etc. distance away from a destination can be allocated vehicle identification numbers 2, 3, . . . , etc., such that the vehicle platoon forms a string of vehicles, with the vehicle identification number forming the index of each vehicle.

The vehicle-specific control parameters may include at least the vehicle identification number, model parameters of a regulator, and/or model parameters of a control loop. The vehicle-specific control parameters may also include details regarding the vehicle category, the braking capacity, the fuel consumption, the fuel level and/or the engine specifications and other vehicle specifications.

The kinematic targets may include at least specified targets for the speed of the first and second vehicles in the at least one pair of vehicles along a route, the distance between the first vehicle and the second vehicle of the at least one pair of vehicles and/or the headway time between the first vehicle and the second vehicle of the at least one pair of vehicles.

The kinematic state parameters may include at least time-dependent measured values for the speed of the first and/or the second vehicle of the at least one pair of vehicles, the distance between the first vehicle and the second vehicle of the at least one pair of vehicles and/or the headway time between the first vehicle and the second vehicle of the at least one pair of vehicles.

The targets along one or more routes are preferably determined by taking traffic information and traffic regulations into account. For example, targets for the headway distances between vehicles can be calculated by taking into account the vehicle categories, braking capacities or the desired fuel consumption along the routes. Speed targets can be calculated, in particular, by taking into account the maximum achievable speeds as stipulated by statutory traffic regulations or on the basis of current traffic information. The headway times can then be calculated using the targets for the headway distances and the speeds.

By means of a platoon formation response and by using vehicle-to-vehicle communication or vehicle-to-network communication, the vehicle platoon manager can then transmit kinematic targets, destination specifications, the vehicle platoon identification number, the vehicle identification numbers and information included in the platoon formation requests, such as vehicle-specific control parameters, to the at least two vehicles in the vehicle platoon. Vehicle platooning can be completed by the at least two vehicles in the vehicle platoon transmitting an acknowledgement to the vehicle platoon manager. The vehicle platooning is preferably completed when the vehicle platoon manager has received an acknowledgement from the at least two vehicles in the vehicle platoon.

During or after vehicle platooning, the vehicle platoon manager may define at least one maximum delay time for the vehicle-to-vehicle communication such that at least one condition for maintaining the string stability is fulfilled when the kinematic targets and the vehicle-specific control parameters are taken into account. The at least one condition for the string stability may be based on a cooperative adaptive cruise control model (CACC). The at least one condition for the string stability may be based, in particular, on a cooperative adaptive cruise control model (CACC).

A CACC model can mathematically describe at least approximately the manner of operation of a CACC system with which the at least two vehicles in the vehicle platoon may be equipped. A CACC system may include at least a radar system and/or a lidar system, a communication system and a regulator for controlling the brake and engine system by means of actuators.

A CACC model is described, for example, in reference [1] V. Naus et al., "String-Stable CACC Design and Experimental Validation: A Frequency Domain-Approach", IEEE Transactions on Vehicular Technology, November 2010, pp. 4268-4279. The CACC model may comprise a control loop, whereby a control loop includes a model module for a controller, preferably a PD (proportional-derivative) controller or a PID (proportional-integral-derivative) controller, a model module for the control dynamics, preferably a linear model module for the control dynamics, a feedback filter, preferably a feedback filter for maintaining a predefined headway time between the first and the second vehicle of the at least one pair of vehicles, a model module for a feed forward filter, a model module for the vehicle-to-vehicle communication delay and a model module for signal reconstruction. The input variables of a control loop for controlling a vehicle in the vehicle platoon may include values for at least one kinematic control parameter and at least one kinematic state parameter. The control loop can then influence or regulate the control of a vehicle in the vehicle platoon, preferably actuators of the brake system and the engine, by taking the input variables and the kinematic targets into account. In addition, absolute or relative positions and/or lengths of one or more vehicles can also be taken into account as input variables. In this regard, control can be carried out with the aim of adjusting values for at least one kinematic state parameter to the kinematic targets, while ensuring the string stability of the vehicle platoon.

A control loop of a first vehicle in the vehicle platoon, in particular of the lead vehicle of the vehicle platoon, can also be formed without input variables. A control loop of a vehicle in the vehicle platoon that is located at the end of the vehicle platoon can also be formed without output variables.

String stability exists, in particular, when there is little or no amplification along the vehicle platoon of disruptions in the kinematic state of the vehicles in the vehicle platoon, triggered for example by a vehicle further ahead in the vehicle platoon braking or accelerating. The string stability condition ensures that this is the case. Meeting the string stability condition ensures, in particular, that values of a kinematic control parameter that can describe a change in kinematic state do not increase along the vehicle platoon. The kinematic control parameter may be the vehicle acceleration and/or a control loop error signal, so meeting the string stability conditions ensures that the vehicles in the vehicle platoon are accelerated or decelerated to substantially the same (positive) extent. The vehicle acceleration or the acceleration (both expressions are used synonymously in the following) can be the current acceleration (actual vehicle acceleration) or the intended acceleration (setpoint vehicle acceleration).

At least one condition for the string stability can be derived from a CACC model by calculating the propagation, along the vehicle platoon, of the values of the at least one kinematic control parameter as information or as input variables of control loops. For example, a string stability condition for the at least one pair of vehicles in the vehicle platoon can be given by $$\Lambda_i(s) = \left| \frac{D_i(s)F_i(s) + K_i(s)G_{i-1}(s)}{1 + K_i(s)G_i(s)H_i(s)} \right| \leq 1$$

where $D_i(s)=T_i(s)Z_i(s)$. In the equation above, subindex i denotes the vehicle identification number of the second vehicle of the at least one pair of vehicles. Subindex i then denotes the first vehicle of the at least one pair of vehicles. The transfer function $\Lambda_i(s)$ is formed by the Laplace transform to the time domain of a model function for the vehicle-to-vehicle communication delay $T_i(s)=e^{-\delta_i s}$, a model function for the signal reconstruction $Z_i(s)$, wherein the model function for the signal reconstruction by a sample and hold element is given by the transmission function $$Z_i(s) = \left(1 - e^{-\theta_i s}\right)/(\theta_i s)$$

a model function for a PD controller $K_i(s)=k_{p,i}+k_{d,i}s$, a model function for the control dynamics $G_i(s)=k_{G,i}e^{-\phi_i s}/(s^2(\tau_i s+1))$, a model function for a feed forward filter $F_i(s)=G_{i-1}(s)/(G_i(s)H_i(s))$, and a model function for a feedback filter $H_i(s)=1+h_i s$. If the vehicles in the platoon are identical, i.e. $G_{i-1}(s)=G_i(s)$, the function $F_i(s)$ is simplified to $$F_i(s) = 1/H_i(s)$$

and the string stability condition is simplified to $$\Lambda_i(s) = \left| \frac{D_i(s)F_i(s) + K_i(s)G_i(s)}{1 + K_i(s)G_i(s)H_i(s)} \right| \leq 1$$

The s parameter denotes the complex frequency of the Laplace transform of the model functions. The parameter Si specifies the transmission time of a data packet and may depend on the modulation used, the coding, the size of a data packet and the available transmission resources. Furthermore, $k_{p,i}$, $k_{d,i}$ denote model parameters of a PD controller and $\phi_i$, $\tau_i$, $k_{G,i}$ denote model parameters of a control loop as vehicle-specific control parameters. Typical values for the model parameters introduced above can be found in Ref. [1] and in the references cited therein. The parameter $h_i$ specifies the predefined headway time between the first and the second vehicle of the at least one pair of vehicles, as a kinematic target. The headway time $h_i$ can also be calculated as a kinematic target from a predefined headway distance $$\Delta p_i^{soll}$$

between the vehicles of the pair of vehicles, and a predefined speed $v_i$ of the second vehicle as a kinematic target via the definition $$h_i = \Delta p_i^{soll} / v_i.$$

The string stability condition depends on the delay time $\Theta_i$. The delay time $\Theta_i$ denotes the constant time interval at which the values for the at least one kinematic control parameter can be transmitted as information by the first vehicle of the at least one pair of vehicles and received by the second vehicle of the at least one pair of vehicles. The maximum delay time $$\Theta_i^{max}$$

is typically calculated as a function of the string stability condition. For example, the maximum delay time $$\Theta_i^{max}$$

can be calculated from the condition $A_i=1$ by solving the equation $\Lambda_i=1$ according to the delay time $\Theta_i$. The maximum delay time $$\Theta_i^{max}$$

then specifies the maximum time interval at which values for the at least one kinematic control parameter can be transmitted by the first vehicle of the at least one pair of vehicles to the second vehicle of the at least one pair of vehicles without breaching the string stability condition specified above.

The maximum delay time $$\Theta_i^{max}$$

can be calculated numerically or semi-analytically from the condition $\Lambda_i=1$ with the algorithm comprising the following steps:

The Laplace transform of the model function for the delay in vehicle-to-vehicle communication $D_i(s)$ is approximated by using a Padé approximant.

The exponential function $e^{-\theta_i s}$ in the Laplace transform of the model function for the signal reconstruction $Z_i(s)$ is also approximated using a Padé approximant, so the resolution of the equation Λi=1 according to the delay time $\theta_i$ is obtained by determining the zeros of a polynomial that sums multiples of powers of the delay time $\theta_i$. The multiples of the powers of the delay time $\theta_i$ form the coefficients of the polynomial, which may depend on vehicle-specific control parameters, kinematic state parameters, kinematic targets and the complex frequencies.

The poles of the transfer function $\Lambda_i(s)$ are calculated. The coefficients of the polynomial are then determined for each pole that is used for or instead of the complex frequency s. For each pole and the polynomial coefficients determined with it, the zeros of the polynomial are calculated analytically or numerically using Newton's method, for example.

From the set of real and positive zeros of the polynomial, determined in this way, the smallest zero is defined as the maximum delay time $$\Theta_i^{max}.$$

The at least one maximum delay time $$\Theta_i^{max}$$

for the vehicle-to-vehicle communication can then be determined for each pair of vehicles in the vehicle platoon and for each second vehicle of each pair of vehicles having the vehicle identification number i.

The at least one data transmission session can be uniquely specified by specifying a frequency band or subchannel, a starting time or an initial subframe, and a period duration. In particular, a data transmission session includes a plurality of periodically arranged resource blocks, the time interval between two adjacent, immediately successive resource blocks being defined in each case by the period duration. A resource block forms the smallest unit of time and frequency at which information can be sent and received by means of the data transmission session. The frequency bandwidth of a resource block is defined by the width of the frequency band or subchannel. In the LTE standard, for example, the frequency bandwidth of a resource block comprises 12-15 kHz subcarriers. The temporal width or duration of a resource block is defined by the temporal length of a subframe. In the LTE standard, for example, the duration of a subframe is 1 ms. The at least one data transmission session is preferably a semi-persistent data transmission session.

The period duration of a data transmission session can then be determined for the at least one pair of vehicles in the vehicle platoon as follows:

The at least one maximum delay time $$\Theta_i^{max}$$

for the vehicle-to-vehicle communication can firstly be compared with the values allowed by a mobile network standard for the period duration of the at least one data transmission session. In the LTE-V2X standard, for example, 20 ms, 50 ms, 100 ms, 200 ms, . . . etc. are specified as permitted values for the period duration. The smallest period duration in the LTE-V2X standard is therefore 20 ms.

From the set of permitted values for the period duration of the at least one data transmission session, those values are firstly determined that are less than or equal to the at least one maximum delay time $$\Theta_i^{max}$$

for the vehicle-to-vehicle communication, and from those values that are less than or equal to the at least one maximum delay time $$\Theta_i^{max}$$

for the vehicle-to-vehicle communication, the value that has the smallest time interval away from the at least one maximum delay time $$\Theta_i^{max}$$

for the vehicle-to-vehicle communication is selected.

The uniquely determined value from the set of permitted values can then form a value for the period duration of the at least one data transmission session.

If the at least one maximum delay time $$\Theta_i^{max}$$

for the vehicle-to-vehicle communication is less than the smallest permitted period duration of the at least one data transmission session, the period duration of the at least one data transmission session can also be allocated exactly this smallest permitted value.

It is advantageous if the at least one data transmission session includes a plurality of resource blocks arranged periodically in time, the time interval between adjacent resource blocks arranged one immediately after the other in time being defined by a period duration of the at least one data transmission session, that is less than the at least one maximum delay time for the vehicle-to-vehicle communication.

The at least one pair of vehicles in the vehicle platoon can also be allocated at least two data transmission sessions as transmission resources for transmitting and/or receiving information by means of the vehicle-to-vehicle communication, wherein the at least two data transmission sessions may have the same period duration but different starting times or initial subframes, and the time interval between the starting times or initial subframes is less than the period duration of the at least two data transmission sessions. It is particularly preferable that the resource blocks forming the at least two data transmission sessions do not overlap in time. The at least two data transmission sessions are preferably at least two semi-persistent data transmission sessions.

It is particularly preferable that the at least one pair of vehicles in the vehicle platoon can be allocated a plurality of data transmission sessions, each of identical period duration, as transmission resources for transmitting and/or receiving information by means of the vehicle-to-vehicle communication. The time interval between the starting times of the semi-persistent data transmission sessions adjacent in time can be given by $$\frac{T_{SPS}}{N_{SPS}} \in \mathbb{N},$$

where $T_{SPS}$ is dimensionless and denotes the period duration in milliseconds determined by means of the maximum delay time $$\Theta_i^{max}$$

from the set of permitted values, and $N_{SPS}$ denotes the number of data transmission sessions.

In this way, it is possible for the first vehicle of the at least one pair of vehicles, for example, to transmit values for the at least one kinematic control parameter as information to the second vehicle of the at least one pair of vehicles via the vehicle-to-vehicle communication with a time interval that is less than the smallest value permitted by a mobile network standard for the period duration of a data transmission session. The first vehicle of the at least one pair of vehicles preferably sends values for the at least one kinematic control parameter as information to the second vehicle of the at least one pair of vehicles with a time interval that is less than 20 ms.

The vehicle platoon manager may also request a scheduler of a mobile network, for example an LTE scheduler, to determine transmission resources for the vehicle-to-vehicle communication between the at least one pair of vehicles and to allocate them to the first and second vehicle of the at least one pair of vehicles. To that end, the vehicle identification number of the first vehicle for transmitting information, the vehicle identification number of the second vehicle for receiving information and the period duration of the at least one data transmission session can be transmitted to the scheduler. The scheduler can then determine the frequency band or subchannel and the starting time or initial subframe of the at least one data transmission session.

If the vehicle platoon manager has determined that at least two data transmission sessions are to be allocated to the at least one pair of vehicles, the vehicle platoon manager can also and additionally transmit the time interval between the starting times or initial subframes of the at least two data transmission sessions to the scheduler. In that case, the scheduler can also treat the at least two data transmission sessions as a single data transmission session and determine a frequency band or subchannel and a starting time or initial subframe for that one single data transmission session.

The scheduler, a mobile network stack or the vehicle platoon manager can then allocate and/or initiate the transmission resources for the vehicle-to-vehicle communication to the at least one pair of vehicles in the vehicle platoon by informing the communication units of the vehicles of the at least one pair of vehicles about the respective frequency bands of subchannels, the starting times or subframes and the period durations of the at least one or of the at least two data transmission session(s) for transmitting and/or receiving information and/or by instructing them to start transmitting and/or receiving information by means of the at least one or the at least two data transmission session(s).

The transmission resources for the vehicle-to-vehicle communication can satisfy a half-duplex condition. If the transmission resource comprises time resources, it is preferable that resource blocks which are allocated to two immediately successive vehicles in the vehicle platoon for transmitting and/or receiving information do not overlap in time. This ensures that the first vehicle of the at least one pair of vehicles cannot transmit information at the same time or in the same time period as the second vehicle of the at least one pair of vehicles.

The transmission resources for the vehicle-to-vehicle communication can be synchronized by means of synchronization signals that are sent via a base station of a mobile communication network to a network vehicle in the vehicle platoon or to the at least two vehicles in the vehicle platoon.

Information can be sent and received via the allocated transmission resources until such time as transmission resources are reallocated or reinitiated.

The kinematic targets can be redefined in response to at least one external event during the trip. Steps (a) and (b) can be carried out anew with the new kinematic targets that replace the kinematic targets defined before the occurrence of the at least one external event, so that the at least one maximum delay time and the transmission resources respectively allocated to the first and the second vehicle of the at least one pair of vehicles for the vehicle-to-vehicle communication can be adapted to the actual trip itinerary.

An external event may occur and be report to the vehicle platoon manager in the following situations, for example:

A vehicle in the vehicle platoon intends to leave the vehicle platoon, and/or a new vehicle would like to join the vehicle platoon.

The target values for the headway distance between the first vehicle and the second vehicle of the at least one pair of vehicles are changed or updated by the vehicle platoon manager, for example in response to new traffic information or weather information.

The route is changed by the vehicle platoon manager in response to updated traffic information, for example.

The target values for the speed of the at least two vehicles in the vehicle platoon are changed, for example if the lead vehicle reaches a town, a school zone, a pedestrian precinct, a building site, or sections of road where the maximum speed is lower. For example, new maximum speeds can also be detected by a navigation system or by on-board sensors, and the destination specifications can be adapted accordingly.

A vehicle in the vehicle platoon reports to the vehicle platoon manager that the vehicle-specific control parameters have changed, for example because the vehicle in question is impaired as a result of an accident or engine damage.

An external event can also be caused by sudden braking initiated by a driver of the vehicle or by an external operator.

A vehicle in the vehicle platoon or an external operator that can exchange information with the vehicle platoon manager via a mobile communication network can inform the vehicle platoon manager about an external event that has occurred and if necessary can specify new destination parameters and/or update the vehicle-specific control parameters. The vehicle platoon manager can then redefine the kinematic targets and inform the vehicles in the vehicle platoon about the change in the kinematic target parameters and/or carry out individual or all the vehicle platooning steps again.

Each of the at least two vehicles in the vehicle platoon preferably includes a cooperative adaptive cruise control system (CACC) configured to regulate control of the respective vehicle in the vehicle platoon by means of a closed-loop control system, and/or a satellite positioning system.

The at least one communication system which is configured to transmit and/or receive information by means of vehicle-to-vehicle communication can also be configured to transmit or receive information to/from a base station of a mobile communication network by means of vehicle-to-vehicle communication. The mobile communication network can be a mobile communication network designed according to the 4G or LTE standard or according to the 5G standard. However, the mobile communication network can also be designed in some other way.

The communication systems of the at least two vehicles in the vehicle platoon are configured for the vehicle-to-vehicle communication in such a way that values for the at least one kinematic control parameter are transmitted as information only unidirectionally along the vehicle platoon between any two successive vehicles in the vehicle platoon.

It is particularly preferred that the at least one kinematic control parameter includes at least the acceleration of the first vehicle of the at least one pair of vehicles.

The at least two vehicles in the vehicle platoon may each include a mobile radio transmitter unit and/or a mobile radio receiver unit. The mobile radio transmitter unit and the mobile radio receiver unit may be designed in accordance with the 4G (LTE) standard or the 5G standard. If a mobile communication network according to the LTE standard is used, the vehicle-to-vehicle communication can be carried out via at least one PC5 interface of an LTE transmitter unit and/or an LTE receiver unit.

The invention also provides a system comprising a vehicle platoon manager designed to carry out the method. The system may also include an arrangement of at least two vehicles forming a vehicle platoon, which is designed to carry out the method described.

The invention also provides a computer software product comprising a computer program (e.g. a sequence of commands) that includes software for performing the method described, and or for controlling the arrangement described, when the computer program runs on a processing unit. The computer software product can be loaded directly into an internal memory or storage unit of the processing unit, or is already stored therein, and typically comprises parts of a program code for performing the described method or for controlling the described system when the computer software product runs or is executed on the processing unit. The computer software product may be stored on a machine-readable storage medium, for example on a digital storage medium.

Figure 2:
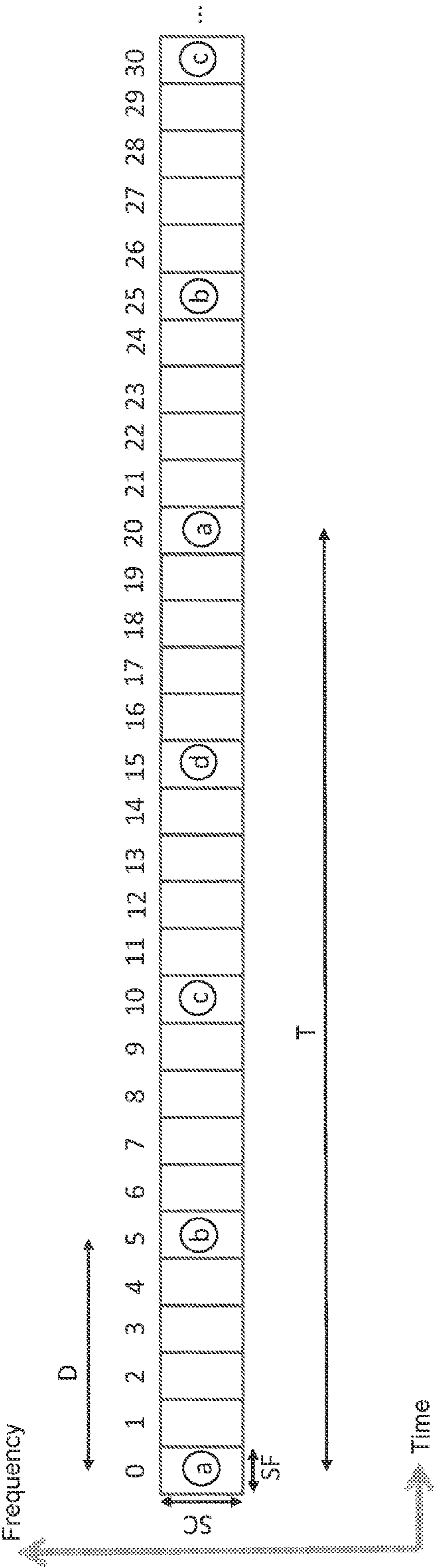
Figure 3:
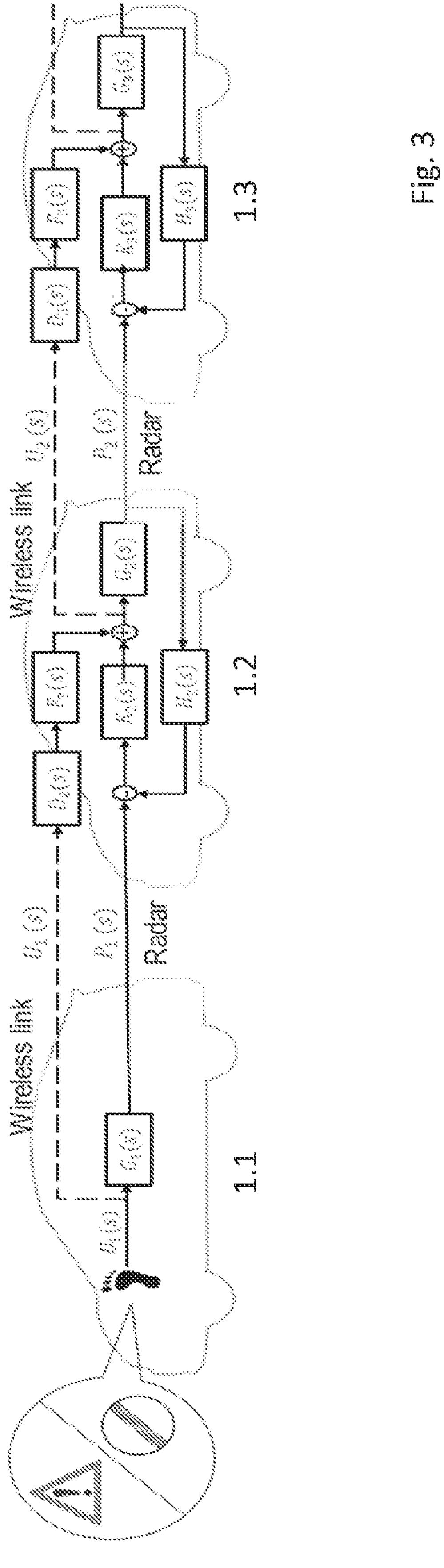
Figure 4:
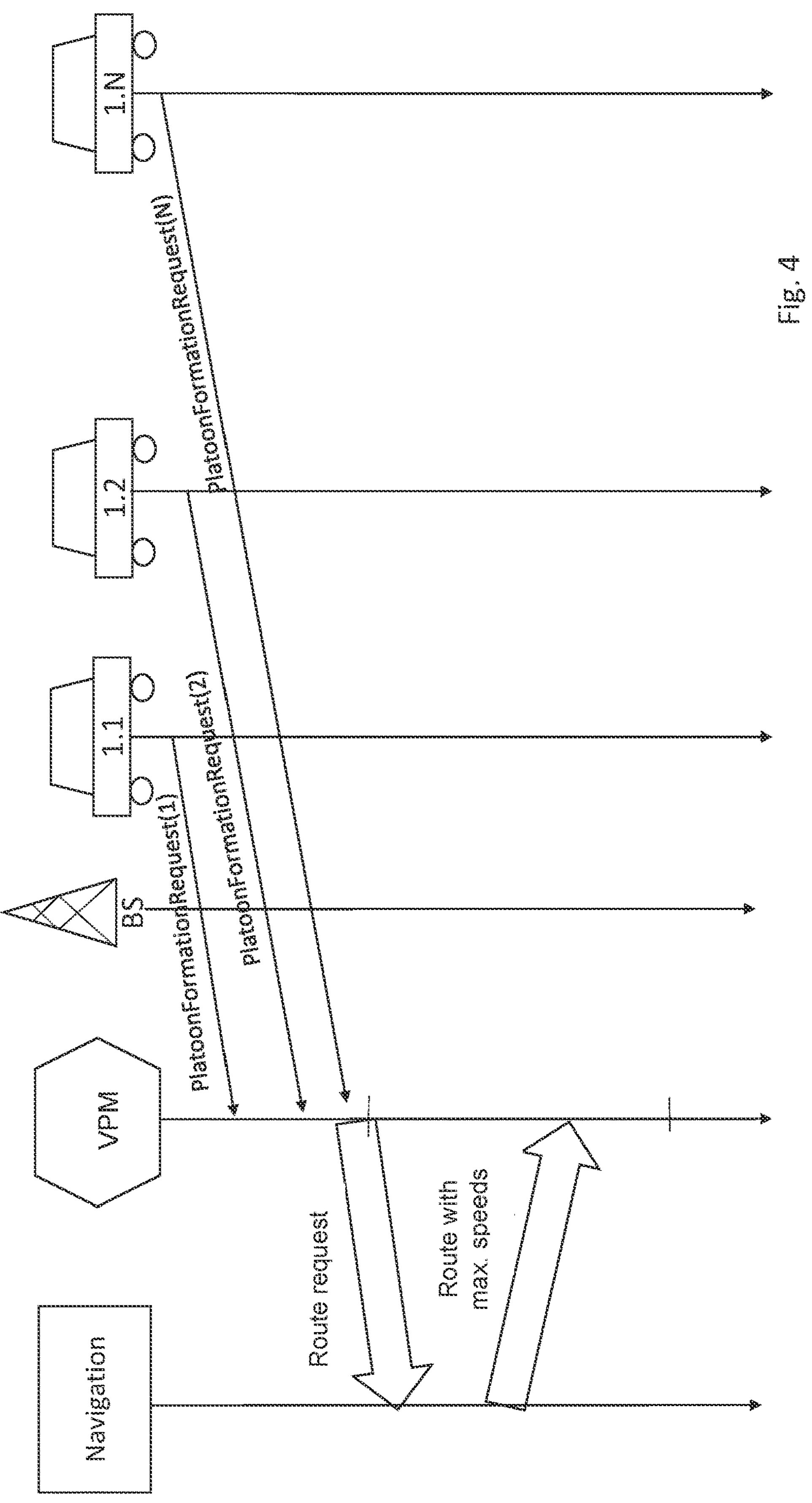
Figure 5:
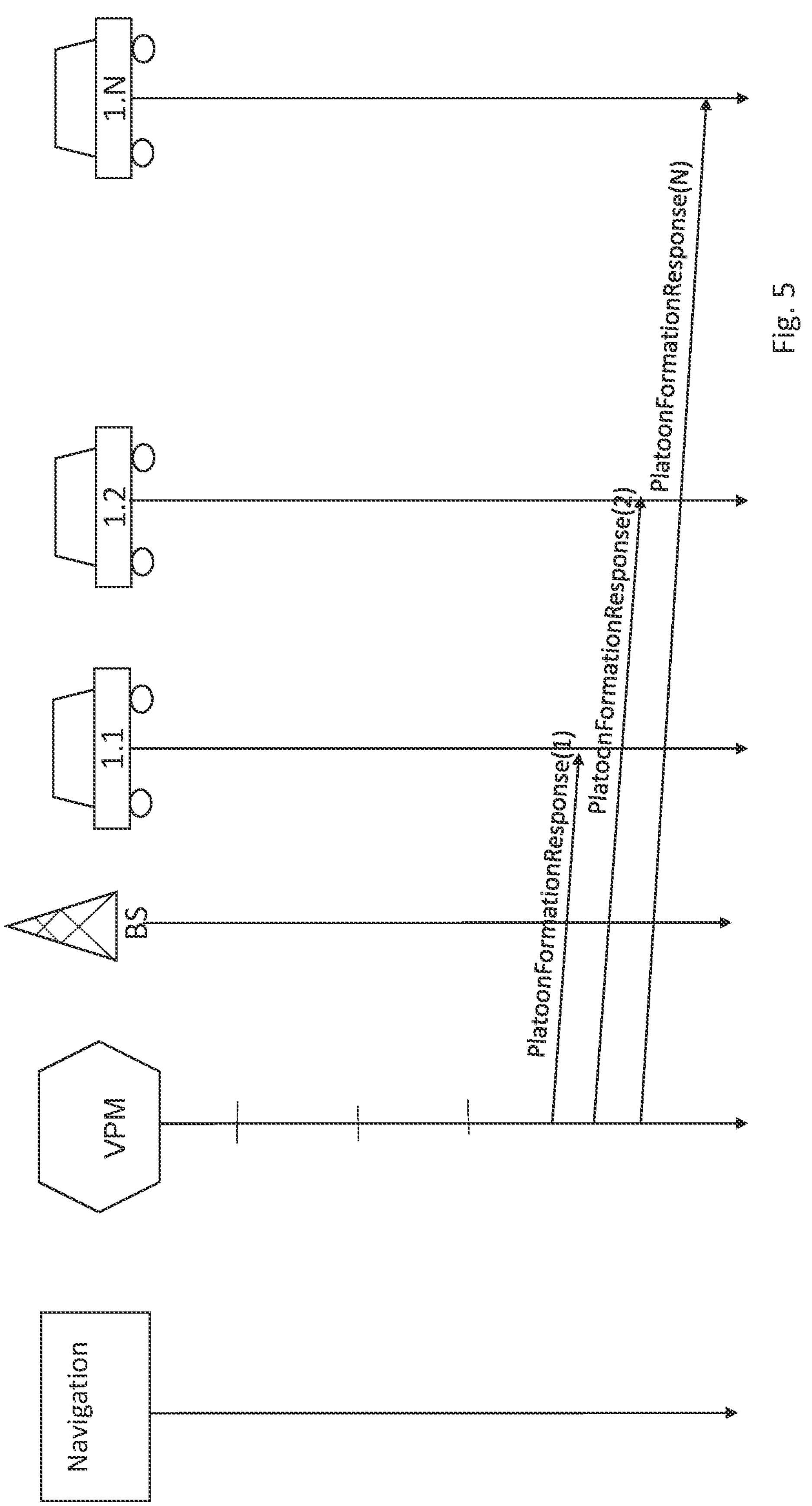
Figure 6:
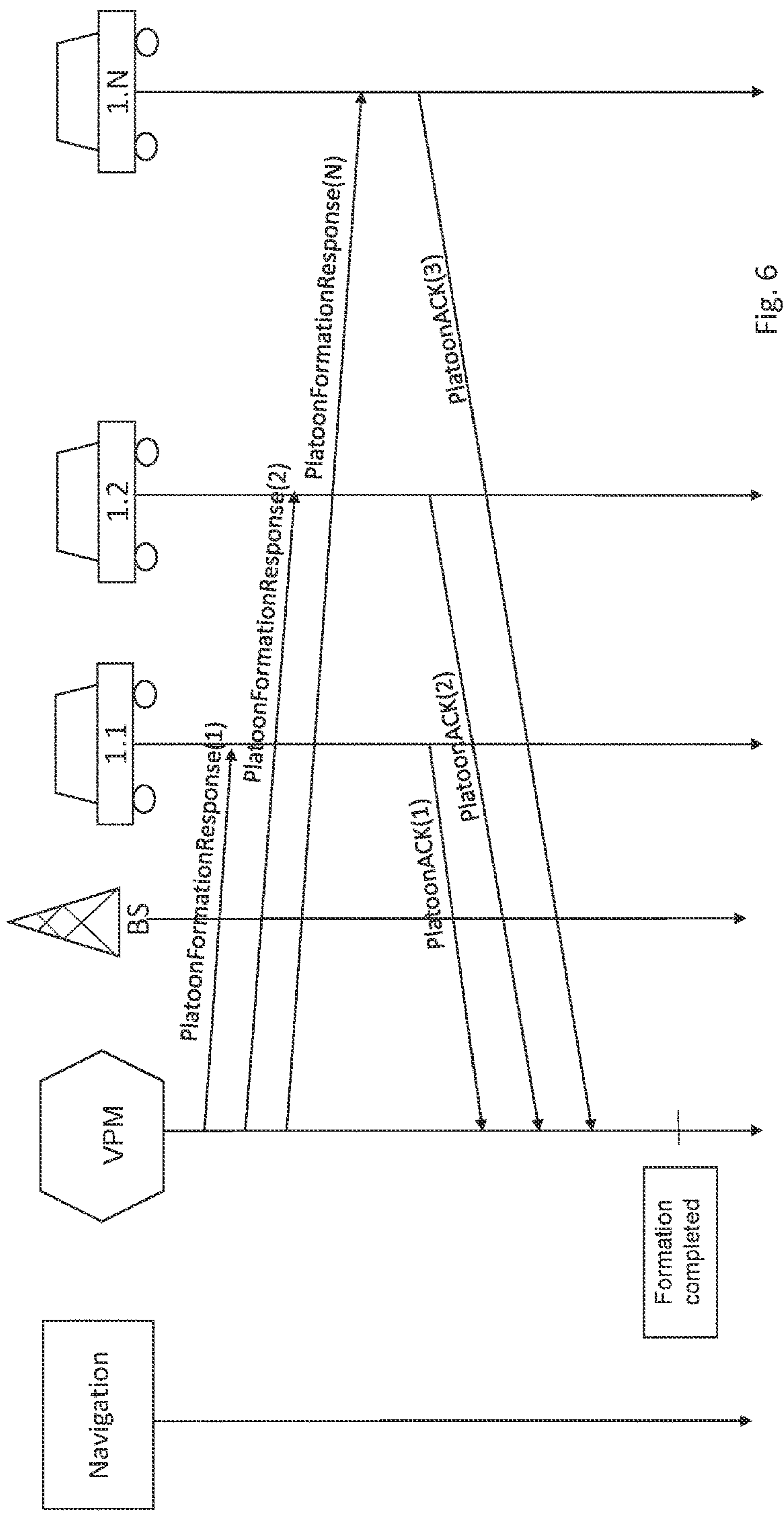
Figure 7:
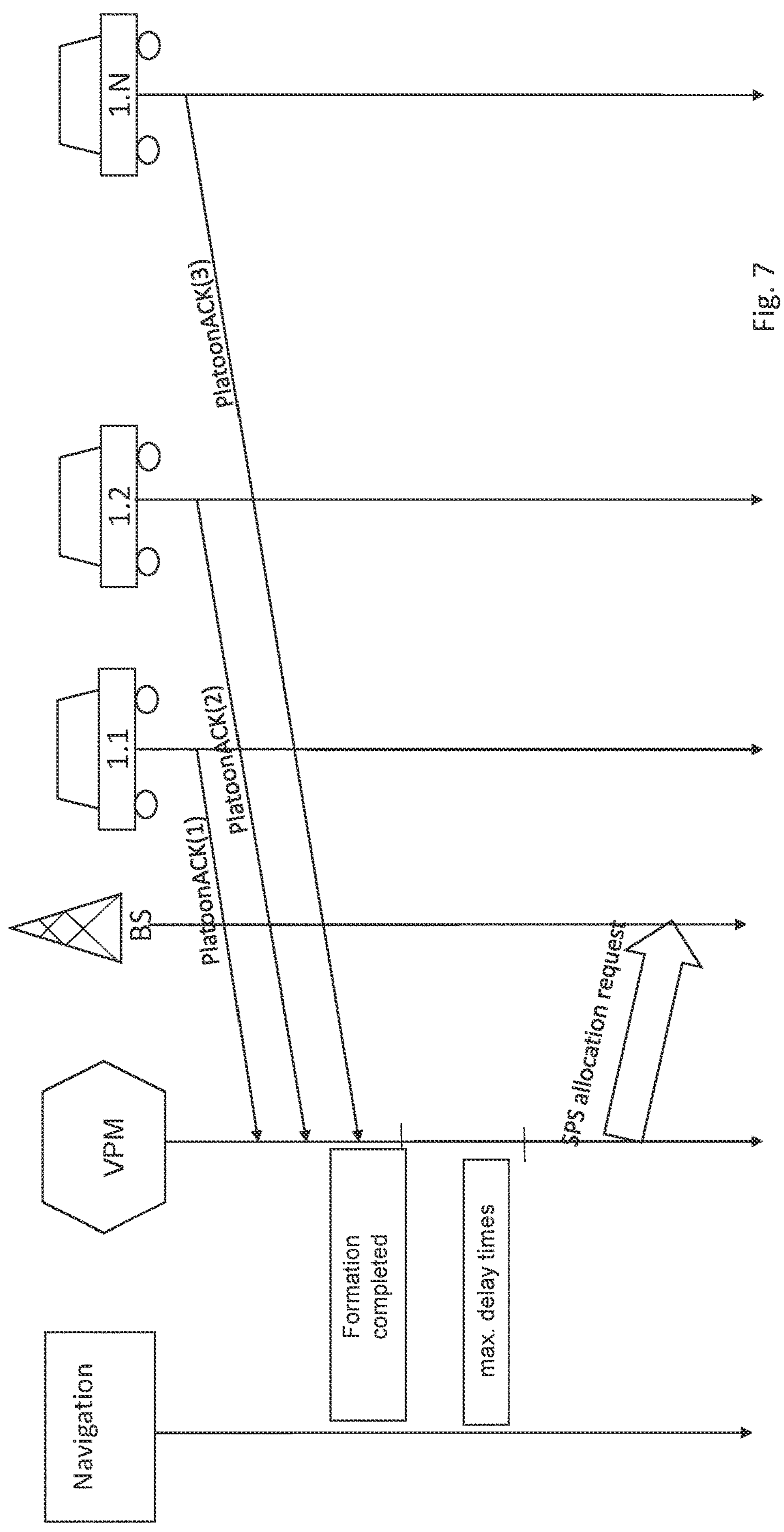
Figure 8:
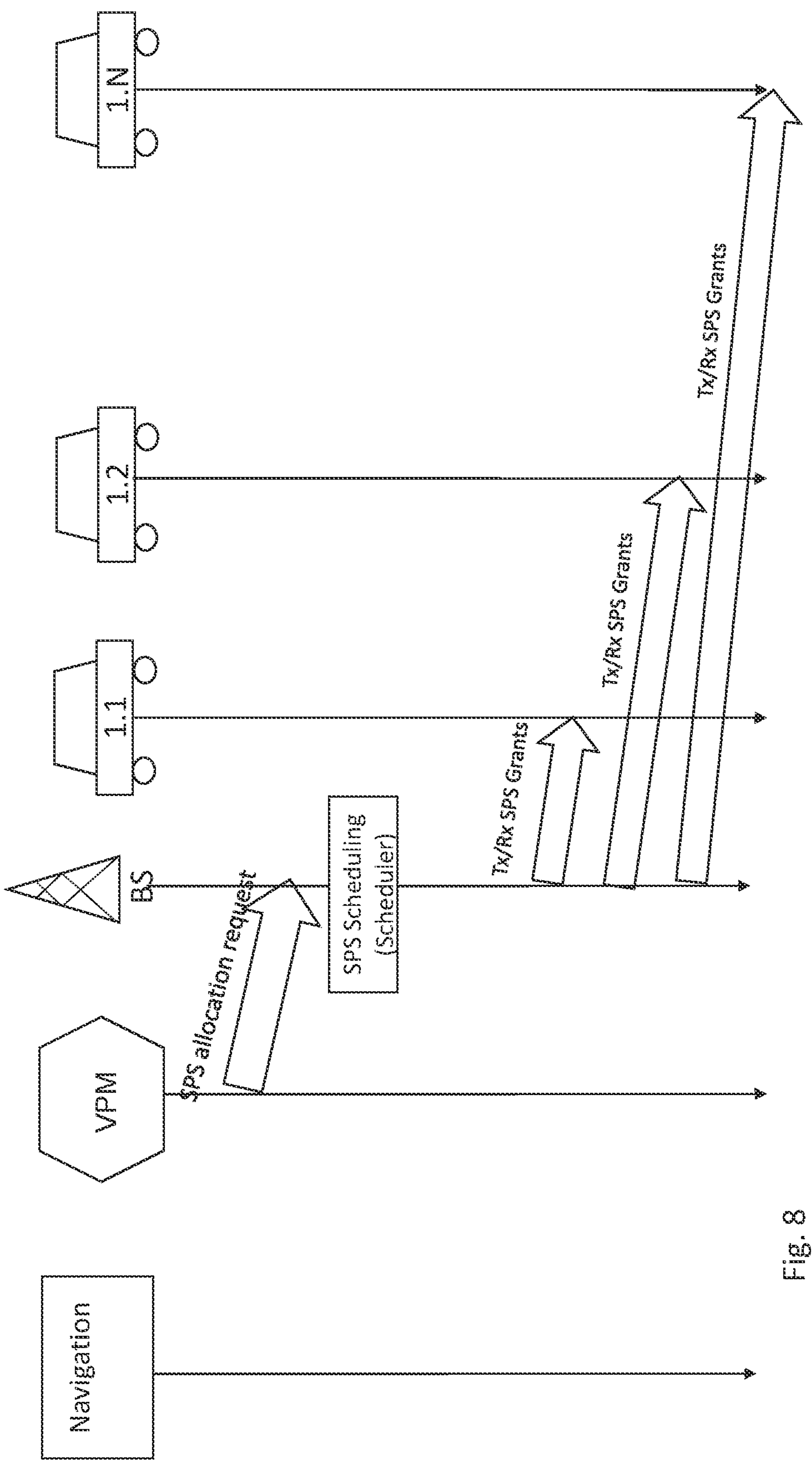
Figure 9:
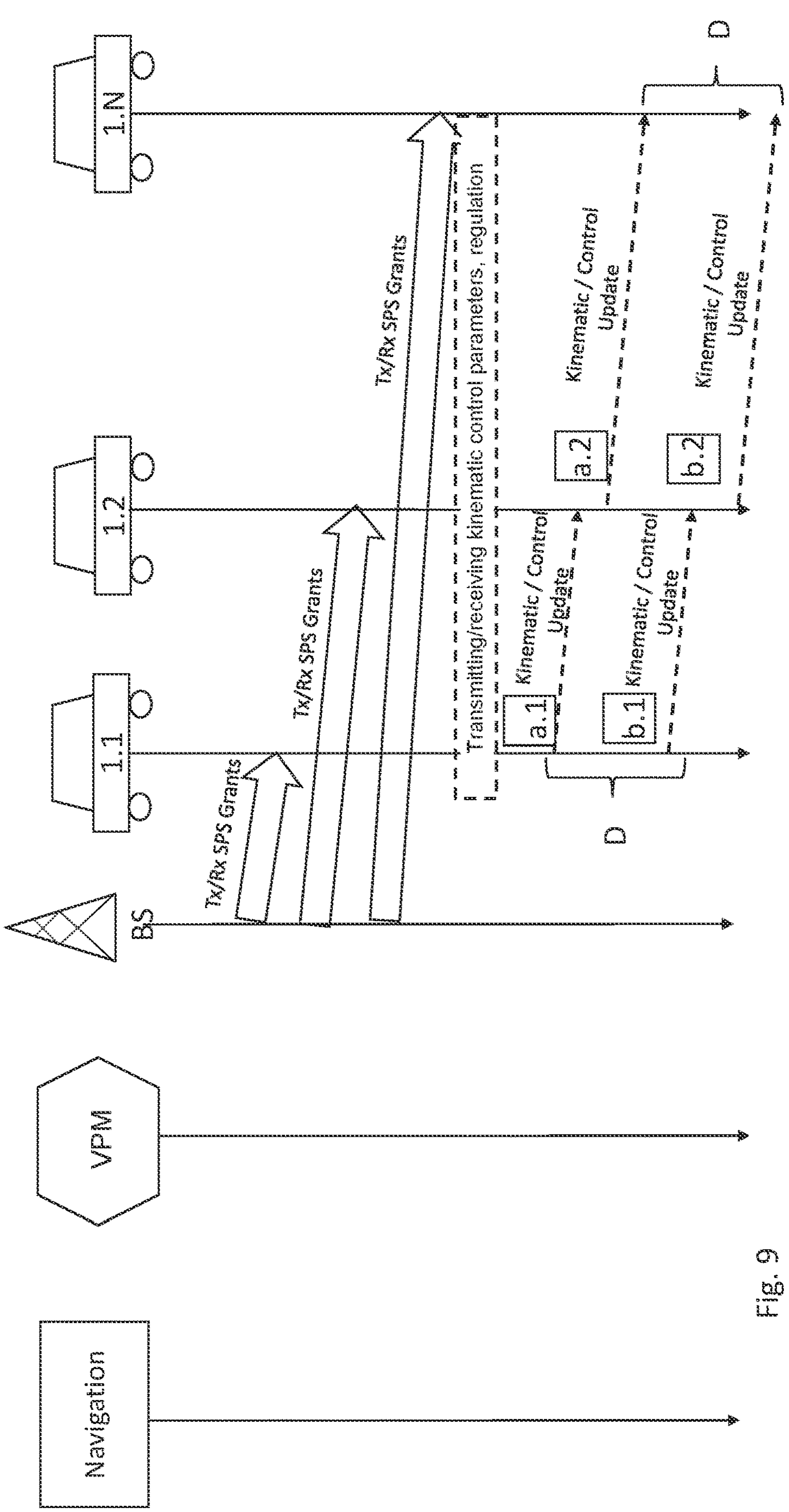
Figure 10:
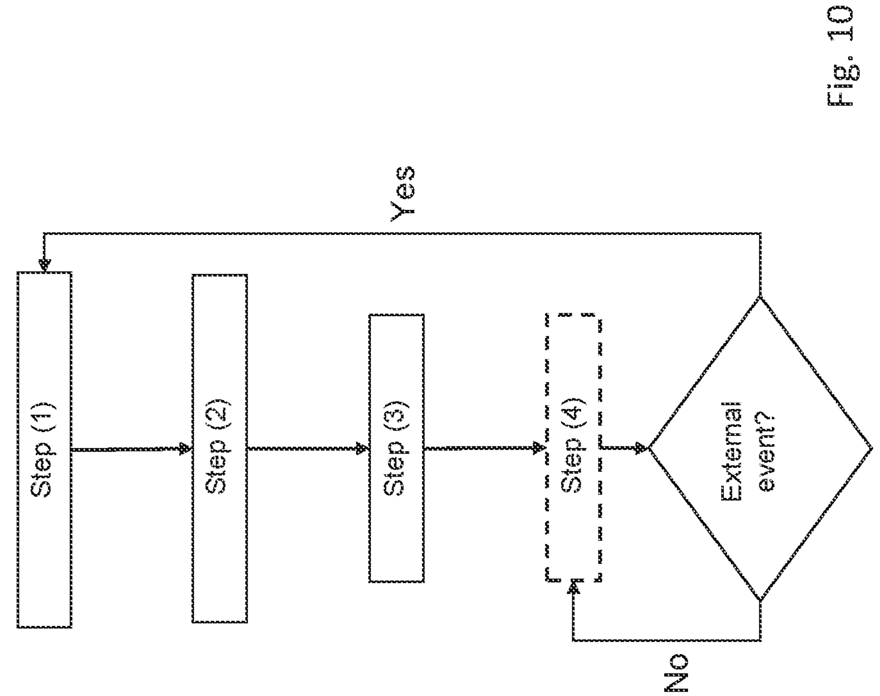

Embodiments of the invention are shown in the drawings and shall now be described with reference to FIGS. 1 to 10, in which:

FIG. 1 shows a schematic view of the vehicle platoon of the vehicle platoon manager and a base station of the mobile communication network, FIG. 2 shows a schematic view of time and frequency resources for the vehicle-to-vehicle communication, which includes four semi-persistent data transmission sets, FIG. 3 shows a schematic view of control loops of a CACC model, FIG. 4 shows a schematic view of vehicle platooning steps, comprising the transmission of notices of intent and determination of the destination specifications, FIG. 5 shows a schematic view of vehicle platooning steps, comprising the transmission of formation responses, FIG. 6 shows a schematic view of vehicle platooning steps, comprising the transmission of notices of acknowledgement, FIG. 7 shows a schematic view of steps in the method according to the invention, comprising the determination of at least one maximum delay time for the vehicle-to-vehicle communication, FIG. 8 shows a schematic view of steps in the method according to the invention, comprising the determination and allocation of time and frequency resources for the vehicle-to-vehicle communication, FIG. 9 shows a schematic view of steps in the method according to the invention, comprising the transmission and receiving of values for at least one kinematic control parameter, FIG. 10 shows a schematic view of a timing diagram, comprising steps (1)-(4) of the method according to the invention.

FIG. 1 shows, in a schematic view, a vehicle platoon comprising three vehicles 1.1, 1.2, 1.3. The three vehicles 1.1, 1.2, 1.3 (passenger vehicles in the embodiment shown in FIG. 1) are each equipped with a communication unit which is configured to transmit and receive information by means of vehicle-to-vehicle communication V2V via a mobile communication network and by means of vehicle-to-network communication V2N via a base station BS of the mobile communication network. In the embodiment shown, the communication units each include a mobile radio transmitter unit and a mobile radio receiver unit. In the example shown in FIG. 1, vehicles 1.1, 1.2, 1.3 are all of the same vehicle type, but in other embodiments these vehicles 1.1, 1.2, 1.3 may also be trucks or mobile robots, or selected from different types of vehicle. The mobile communication network can be a mobile communication network designed according to the 4G or LTE standard or according to the 5G standard. However, the mobile communication network can also be designed in some other way. If a mobile communication network according to the LTE standard is used, the vehicle-to-vehicle communication can be carried out via at least one PC5 interface of an LTE transmitter unit and/or an LTE receiver unit.

A vehicle platoon manager VPM, which can be provided in the form of a processing unit with a computer program running on it, is connected to base station BS and the Internet via a mobile communication network and defines the kinematic targets. Two pairs of vehicles can be formed with the vehicle platoon comprising the three vehicles 1.1, 1.2, 1.3. A first pair of vehicles 1.1 and 1.2 includes a first vehicle 1.1 in the vehicle platoon and a second vehicle 1.2 in the vehicle platoon immediately following the first vehicle 1.1 within the vehicle platoon. A second pair of vehicles 1.2 and 1.3 includes a first vehicle 1.2 in the vehicle platoon and a second vehicle 1.3 immediately following the first vehicle 1.2 within the vehicle platoon.

FIG. 2 shows, by way of example, transmission resources for the vehicle-to-vehicle communication V2V, which are allocated to the first vehicle 1.1 for transmitting values for the at least one kinematic state parameter to the second vehicle 1.2, and to the second vehicle 1.2 for receiving those values. Recurrent features are marked with identical reference signs in this Figure and also in the Figures that follow. The maximum delay time determined for the first pair of vehicles 1.1 and 1.2, and which ensures compliance with a string stability condition, is 7 ms. The transmission resources shown in FIG. 2 for the vehicle-to-vehicle communication are time and frequency resources in an LTE mobile communication network. The time and frequency resources include four semi-persistent data transmission sessions a, b, c, d, which start with a time offset, the time interval between the starting times of two semi-persistent data transmission sessions adjacent in time (e.g. a and b, b and c, c and d) being D=5 ms in each case. The period duration of each of the four semi-persistent data transmission sessions is T=20 ms and corresponds to the minimum value for the period duration of a semi-persistent data transmission session in the LTE standard. FIG. 2 shows a total of 30 resource blocks, the temporal width of a resource block corresponding to the duration of a subframe SF in the LTE standard and the frequency bandwidth of a resource block corresponding to the frequency bandwidth of a sub-channel SC in the LTE standard. The limitation to 30 resource blocks is not meant to show any limited duration of the semi-persistent data transmission sessions, but is merely for schematic representation in compact form. Resource blocks 0 and 20 form at least part of semi-persistent data transmission session a, with resource block 0 being arranged in the initial subframe SF of semi-persistent data transmission session a. Resource blocks 5 and 25 form at least part of semi-persistent data transmission session b, with resource block 5 being arranged in the initial subframe of semi-persistent data transmission session b, etc.

FIG. 3 shows a CACC model for the three vehicles 1.1, 1.2, 1.3 in the vehicle platoon. Each vehicle 1.1, 1.2, 1.3 in the vehicle platoon includes a control loop for controlling the respective vehicle. The control loop of the first vehicle 1.1 in the vehicle platoon, which is simultaneously the lead vehicle 1.1 of the vehicle platoon, is described merely by a model function $G_1(s)$ for the control dynamics. The control loop of the second vehicle 1.2 in the vehicle platoon is described by $D_2(s)=T_2(s)Z_2(s)$, where $T_2(s)$ is a model function for the delay in vehicle-to-vehicle communication and $Z_2(s)$ is a model function for the signal reconstruction in the form of a sample and hold element, a model function $K_2(s)$, for a PD controller, a model function $G_2(s)$, for the control dynamics, a model function $F_2(s)$, for a feed forward filter, and a model function $H_2(s)$ for a feedback filter. Input variables of the control loop of the second vehicle 1.2 are defined with values $U_1(s)$ for the instantaneous acceleration of the first vehicle 1.1 in the vehicle platoon as at least one kinematic control parameter (in the Laplace domain), which is transmitted via vehicle-to-vehicle communication V2V, Wireless Link with a time headway of D=5 ms to the second vehicle 1.2, and with values $P_1(s)$ for the instantaneous headway distance between the first vehicle 1.1 and the second vehicle 1.2, the position of the first vehicle 1.1 and/or of the second vehicle 1.2, and/or the instantaneous speeds of the first vehicle 1.1 and/or of the second vehicle 1.2 as kinematic state parameters (in the Laplace domain), which can be sensed by at least one radar system located on or in the second vehicle 1.2 as at least one measuring apparatus in the form of radar or lidar, and/or a satellite positioning system. Further input variables for the control loop shown in FIG. 3 include the lengths of the respective vehicles (not shown).

The instantaneous headway time between the first vehicle 1.1 and the second vehicle 1.2 is then calculated as a kinematic state parameter, for example by the at least one measuring apparatus itself or by a processor or other processing means connected thereto, using the values $P_1(s)$ for the instantaneous headway distance between the first vehicle 1.1 and the second vehicle 1.2, the position of the first vehicle 1.1 and/or of the second vehicle 1.2, and/or the instantaneous speeds of the first vehicle 1.1 and/or of the second vehicle 1.2 as kinematic state parameters. The control loop of the second vehicle 1.2 then regulates the dynamics or control of the second vehicle 1.2 with the aim of adjusting the headway times sensed or determined by means of the radar system as kinematic state parameters to the kinematic targets previously transmitted by the vehicle platoon manager VPM by means of a platoon formation response to the second vehicle 1.2. This procedure is repeated analogously in the third vehicle 1.3 in the vehicle platoon, wherein the third vehicle 1.3 is located at the end of the vehicle platoon and therefore does not transmit any values for the instantaneous acceleration of the third vehicle 1.3 to another vehicle in the vehicle platoon. In the embodiment shown in FIG. 3, the respective control loop is implemented as a computer program in a control/regulation unit of the respective vehicle 1.1, 1.2, 1.3. The control loop model shown in FIG. 3 describes in approximate form the implementation of a CACC system in the respective vehicles or the vehicle platoon.

FIG. 4 shows a schematic view of a vehicle platooning step in which vehicles 1.1, 1.2, 1.N in the vehicle platoon, where N=3 indicates the number of vehicles in the vehicle platoon, each transmit a notice of intent (PlatoonFormationRequest( )) to the vehicle platoon manager VPM using LTE PUSCH transmission. The platoon formation request includes at least position details, target coordinates as vehicle-specific destination specifications, and vehicle-specific control parameters. The vehicle platoon manager VPM then specifies a route and transmits a route request via the Internet to a navigation system marked "Navigation" in FIG. 4. The navigation system (Navigation) then transmits traffic information, in particular traffic regulation information that includes the maximum permitted speeds along the route, via the Internet to the vehicle platoon manager VPM. The vehicle platoon manager VPM defines the kinematic targets by taking destination parameters and vehicle-specific control parameters into account.

In a view corresponding to the one shown in FIG. 4, FIG. 5 shows a vehicle platooning step in which the vehicle platoon manager VPM transmits a formation notice PlatoonFormationResponse( ) to each vehicle 1.1, 1.2, 1.N in the vehicle platoon by means of LTE PDSCH transmission. The platoon formation response to a vehicle 1.1, 1.2, 1.N in the vehicle platoon includes at least the vehicle platoon identification number, the vehicle identification number, kinematic targets, destination parameters and vehicle-specific control parameters of that further vehicle which is directly ahead of the vehicle in the vehicle platoon string. These values or parameters can be used, in particular, to calculate the feed forward filter, if this is provided for in the control loop or CACC system of the vehicle.

In a view corresponding to the one shown in FIG. 4, FIG. 6 shows a vehicle platooning step in which each vehicle 1.1, 1.2, 1.N in the vehicle platoon transmits a notice of acknowledgement PlatoonACK( ) to the vehicle platoon manager VPM. The notice of acknowledgement includes at least the vehicle platoon identification number, the vehicle identification number and an acknowledgement value (AcK=1) or a refusal value (AcK=0). Vehicle platooning is completed as soon as all the vehicles 1.1, 1.2, 1.N in the vehicle platoon have transmitted an acknowledgement value.

In a view corresponding to the one shown in FIG. 4, FIG. 7 shows the determination of at least one maximum delay time for the vehicle-to-vehicle communication for each pair of vehicles 1.1/1.2 and 1.2/1.N in the vehicle platoon by the vehicle platoon manager VPM, where the at least one maximum delay time is determined in such a way that a string stability condition is met when the kinematic targets and vehicle-specific control parameters are taken into account. Based on the at least one maximum delay time, the vehicle platoon manager VPM determines, for each pair of vehicles 1.1/1.2 and 1.2/1.N in the vehicle platoon, the number and period durations of the semi-persistent data transmission sessions for transmitting and receiving information.

In a view corresponding to the one shown in FIG. 4, FIG. 8 shows the determination and allocation of transmission resources for the vehicle-to-vehicle communication, where the vehicle platoon manager VPM requests the scheduler of a mobile communication network, such as a 4G or 5G mobile communication network, via base station BS (SPS allocation request) to allocate the transmission resources for the vehicle-to-vehicle communication. The scheduler then specifies, for each single, unified semi-persistent data transmission session, the respective specific transmission resources for each vehicle 1.1, 1.2, 1.N in the vehicle platoon, preferably taking into account a half-duplex condition in order to avoid interference. The transmission resources thus determined for the vehicle-to-vehicle communication are then transmitted by the scheduler to vehicles 1.1, 1.2, 1.N in the vehicle platoon (Tx/Rx SPS Grants). This means that the transmission resources for the vehicle-to-vehicle communication are also allocated to each vehicle 1.1, 1.2, 1.N in the vehicle platoon.

In the case, described in the foregoing, where vehicle-to-vehicle communication is via an LTE mobile communication network, the vehicle platoon manager VPM transmits to the scheduler at least the number and period durations of the semi-persistent data transmission sessions for transmitting (Tx) and/or receiving (Rx) information, the time intervals D=5 ms between the starting times or initial subframes of the semi-persistent data transmission sessions a and b, b and c, c and d (see FIG. 2), as well as the corresponding vehicle identification numbers and vehicle platoon identification number. Taking a half-duplex condition into account, the scheduler then determines, for each single, unified semi-persistent data transmission session formed by four semi-persistent data transmission sessions, the respective starting times or initial subframes, as well as the frequency bands or subchannels for each vehicle 1.1, 1.2, 1.N in the vehicle platoon. The information, thus determined, for the time and frequency resources for the vehicle-to-vehicle communication is then transmitted by the scheduler to vehicles 1.1, 1.2, 1.N in the vehicle platoon (Tx/Rx SPS Grants).

In a view corresponding to the one shown in FIG. 4, FIG. 9 shows how, by means of the allocated time and frequency resources for the vehicle-to-vehicle communication, values for at least one kinematic control parameter are transmitted by a first vehicle 1.1, 1.2 of a pair of vehicles as information (Kinematic/Control Update) with a time interval D=5 ms that is less than the at least one maximum delay time of 7 ms and also less than the period durations of the four semi-persistent data transmission sessions a, b, c, d T=20 ms (see FIG. 2), and received by a second vehicle 1.2, 1.N of a pair of vehicles. In the embodiment shown in FIG. 9, resource blocks a.1, b.1 of semi-persistent data transmission sessions a, b are used to that end by the first vehicle 1.1 of the first pair of vehicles 1.1, 1.2 for transmitting to the second vehicle 1.2 of the first pair of vehicles 1.1, 1.2, and resource blocks a.2, b.2 of semi-persistent data transmission sessions a, b are used by the first vehicle 1.2 of the second pair of vehicles 1.2 and 1.N for transmitting to the second vehicle 1.N of the second pair of vehicles 1.2 and 1.N. By taking into account these transmitted and received values for the at least one kinematic control parameter, the respective second vehicles 1.2, 1.N of each pair of vehicles can then regulate control via a control loop or CACC system, as described in FIG. 3.

FIG. 10 shows a timing diagram comprising steps (1) to (4) of a method for monitoring the vehicle platoon comprising the at least two vehicles 1.1, 1.2, wherein the at least two vehicles 1.1, 1.2 in the vehicle platoon are each provided with a communication system which is configured to transmit and/or receive information by means of vehicle-tovehicle communication and with a measuring apparatus which is configured to capture values for at least one kinematic state parameter. In the method, for at least one pair of vehicles 1.1, 1.2 in the vehicle platoon that includes a first vehicle 1.1 in the vehicle platoon and a second vehicle 1.2 in the vehicle platoon immediately following the first vehicle 1.1 within the vehicle platoon, (1) kinematic targets are defined by taking into account destination parameters and vehicle-specific control parameters, (a) at least one maximum delay time for the vehicle-to-vehicle communication is defined in such a way that at least one condition for maintaining the stability of the platoon is fulfilled when the kinematic targets and vehicle-specific control parameters are taken into account, and (3) time and frequency resources for the vehicle-to-vehicle communication are allocated to the first vehicle 1.1 and to the second vehicle 1.2, wherein the allocated time and frequency resources include at least one semi-persistent data transmission session, taking the at least one maximum delay time into account, (4) by means of the allocated time and frequency resources for the vehicle-to-vehicle communication, values for at least one kinematic control parameter are transmitted as information by the first vehicle 1.1 of the at least one pair of vehicles with a time interval that is less than the at least one maximum delay time defined in step (2) and received by the second vehicle 1.2 of the at least one pair of vehicles, and taking into account the received values for the at least one kinematic control parameter, the control of the second vehicle 1.2 of the at least one pair of vehicles is regulated with the aim of adjusting, to kinematic targets, the values for at least one kinematic state parameter measured by means of the at least one measuring apparatus of the second vehicle 1.2 of the at least one pair of vehicles to the kinematic targets defined in step (1), while ensuring the string stability of the vehicle platoon.

If an external event occurs (Yes), steps (1) to (4) are carried out again. In this way, the time and frequency resources for the vehicle-to-vehicle communication and in particular the maximum delay times, resultant period durations and time intervals at which values for at least one kinematic control parameter are transmitted by a first vehicle to a second vehicle of a pair of vehicles are adapted flexibly and efficiently to the actual trip itinerary of vehicles 1.1, 1.2, 1.N in the vehicle platoon.

The invention claimed is:

1. A method for controlling a vehicle platoon containing at least two three vehicles, the at least three vehicles including a pair of vehicles comprising a first vehicle arranged directly ahead of a second vehicle in the vehicle platoon, wherein the pair of vehicles comprise a communication system configured to transmit and/or receive information by means of vehicle-to-vehicle communication, and wherein the second vehicle is designed to regulate control of the second vehicle based on values for at least one kinematic control parameter received from the first vehicle in order to adjust values for at least one kinematic state parameter of the second vehicle to kinematic targets, the method comprising:

(a) determining a maximum delay time for the vehicle-to-vehicle communication such that at least one condition for maintaining a string stability of the vehicle platoon is fulfilled, the at least one condition depending on the kinematic targets and vehicle-specific control parameters, wherein the maximum delay time for the vehicle-to-vehicle communication corresponds to a maximum time interval between consecutive transmissions of values for the at least one kinematic control parameter from the first vehicle to the second vehicle without breaching the string stability; and (b) determining transmission resources for at least one data transmission session for the vehicle-to-vehicle communication between the first vehicle and the second vehicle based on the maximum delay time, wherein the transmission resources are determined such that the values for the at least one kinematic control parameter can be transmitted by the first vehicle using the transmission resources and received by the second vehicle in time intervals less than the maximum delay time.

2. The method according to claim 1, characterized in that at least the first vehicle of the pair of vehicles receives information about the transmission resources determined for the vehicle-to-vehicle communication, and the values for the at least one kinematic control parameter are transmitted in accordance with said information by the first vehicle and received by the second vehicle.

3. The method according to claim 1, characterized in that the kinematic targets are specified based on destination parameters and the vehicle-specific control parameters that are provided at least partly by vehicles in the vehicle platoon.

4. The method according to claim 3, characterized in that the destination parameters include at least one or more destinations, one or more routes, a maximum speed permitted along the one or more routes, and/or traffic information.

5. The method according to claim 1, characterized in that during vehicle platooning each vehicle in the vehicle platoon is assigned a vehicle identification number and destination specifications are defined, wherein vehicle platooning involves plural steps starting prior to specification of the kinematic targets and/or after an external event has occurred.

6. The method according to claim 1, characterized in that the kinematic targets include at least:

specified targets for a speed of the vehicles of the pair of vehicles along a route, or a headway distance between the first vehicle and the second vehicle of the at least one pair of vehicles, or a headway time between the first vehicle and the second vehicle of the at least one pair of vehicles;

or the at least one kinematic state parameter includes at least time-dependent measured values for the speed of the first vehicle or of the second vehicle of the pair of vehicles, or the headway distance between the first vehicle and the second vehicle of the pair of vehicles, or the headway time between the first vehicle and the second vehicle of the pair of vehicles.

7. The method according to claim 1, characterized in that the vehicle-specific control parameters include at least vehicle identification numbers, model parameters of a regulator and/or model parameters of a control loop.

8. The method according to claim 1, characterized in that the at least one condition for the string stability is based on a cooperative adaptive cruise control model (CACC), taking into account the kinematic targets and the vehicle-specific control parameters.

9. The method according to claim 1, characterized in that the at least one data transmission session includes a plurality of resource blocks arranged periodically in time, wherein a time interval between adjacent resource blocks arranged one immediately after the other in time is defined by a period duration of the at least one data transmission session, which is smaller than the maximum delay time.

10. The method according to claim 1, characterized in that the at least one data transmission session is a semi-persistent data transmission session.

11. The method according to claim 1, characterized in that the transmission resources determined for the vehicles in the vehicle platoon satisfy a half-duplex condition, and that resource blocks allocated to two immediately successive vehicles in the vehicle platoon for the transmission of information do not overlap in time.

12. The method according to claim 1, characterized in that at least two data transmission sessions are allocated to the pair of vehicles in the vehicle platoon as transmission resources for transmitting and/or receiving information by means of the vehicle-to-vehicle communication, wherein the at least two data transmission sessions have the same period duration but different starting times, and a time interval between the starting times is less than the period duration of the sessions.

13. The method according to claim 1, characterized in that the first vehicle of the pair of vehicles sends the values for the at least one kinematic control parameter as information to the second vehicle of the pair of vehicles-with a time interval that is less than 20 ms.

14. The method according to claim 1, characterized in that the kinematic control parameter includes at least acceleration of the first vehicle of the at least one pair of vehicles.

15. The method according to claim 1, characterized in that the kinematic targets are redefined due to at least one external event during a journey and steps (a) and (b) are performed with the new kinematic targets that replace the kinematic targets defined before the point in time that the at least one external event occurred.

16. The method according to claim 1, characterized in that each of the at least three vehicles in the vehicle platoon includes a cooperative adaptive cruise control system (CACC) configured to regulate control of the respective vehicle in the vehicle platoon by means of a closed-loop control system, and/or a satellite positioning system.

17. The method according to claim 1, characterized in that the at least one communication system which is configured to transmit and/or receive information by means of vehicle-to-vehicle communication is also configured to transmit or receive information to/from a base station (BS) of a mobile communication network by means of vehicle-to-vehicle communication.

18. The method according to claim 1, characterized in that the communication systems of the at least three vehicles in the vehicle platoon are configured for the vehicle-to-vehicle communication in such a way that the values for the at least one kinematic control parameter are transmitted as information only unidirectionally along the vehicle platoon between any two successive vehicles in the vehicle platoon.

19. The method according to claim 1, characterized in that the vehicle platoon includes a lead vehicle arranged at the start of the vehicle platoon in the direction of travel, an organizer vehicle configured to exchange information between the organizer vehicle and all the other vehicles in the vehicle platoon via the vehicle-to-vehicle communication, and/or a network vehicle configured to exchange information between the network vehicle and a base station (BS) via a vehicle-to-network communication.

20. A system comprising a vehicle platoon manager designed to carry out the method according to claim 1.

* * * * *